(12) United States Patent
Trojanowski et al.

(10) Patent No.: US 7,534,009 B2
(45) Date of Patent: May 19, 2009

(54) DUAL LED POINT-SOURCE ASSEMBLY

(75) Inventors: Alan Trojanowski, Dayton, TX (US); Jonathan Nickel, Houston, TX (US)

(73) Assignee: Automatic Power, Inc., Houston, TX (US)

( * ) Notice: Subject to any disclaimer, the term of this patent is extended or adjusted under 35 U.S.C. 154(b) by 0 days.

(21) Appl. No.: 11/803,921

(22) Filed: May 16, 2007

(65) Prior Publication Data

US 2007/0223230 A1 Sep. 27, 2007

Related U.S. Application Data

(63) Continuation of application No. 11/065,140, filed on Feb. 23, 2005, now abandoned.

(60) Provisional application No. 60/634,306, filed on Dec. 8, 2004.

(51) Int. Cl.
*F21V 33/00* (2006.01)
*F21V 1/00* (2006.01)
*F21V 5/00* (2006.01)
*F21V 13/14* (2006.01)

(52) U.S. Cl. ................... 362/234; 362/235; 362/244; 362/252; 362/800

(58) Field of Classification Search ............... 362/234
See application file for complete search history.

(56) References Cited

U.S. PATENT DOCUMENTS

| 4,598,339 | A | 7/1986 | Ainsworth | 362/72 |
| 6,203,170 | B1 * | 3/2001 | Patrick et al. | 362/234 |
| 6,447,155 | B2 | 9/2002 | Kondo et al. | 362/545 |
| 6,525,668 | B1 * | 2/2003 | Petrick | 362/800 |
| 6,814,475 | B2 | 11/2004 | Amano | 362/487 |
| 7,021,801 | B2 * | 4/2006 | Mohacsi | 362/477 |
| 7,111,961 | B2 * | 9/2006 | Trenchard et al. | 362/294 |
| 2001/0030866 | A1 | 10/2001 | Hochstein | 362/294 |
| 2005/0068777 | A1 * | 3/2005 | Popovic | 362/307 |

* cited by examiner

*Primary Examiner*—Sandra L O'Shea
*Assistant Examiner*—William J Carter
(74) *Attorney, Agent, or Firm*—Elizabeth R. Hall

(57) ABSTRACT

A lighting device having a dual LED point-source assembly containing two high flux LEDs mounted facing each other with LED lenses positioned between the LEDs. At least one heat sink is attached to one of the LEDs. The heat sinks serve to transfer heat from the LEDs to the outside environment. In one embodiment the lighting device is positioned within a fresnel lens to produce a horizontally uniform distribution of light.

27 Claims, 11 Drawing Sheets

DUAL LED POINT-SOURCE ASSEMBLY

CROSS REFERENCE TO RELATED APPLICATIONS

This application claims priority to pending U.S. patent application Ser. No. 11/065,140, filed Feb. 23, 2005 by inventors Alan Trojanowski and Jonathan Nickel and entitled "Dual LED Point-Source Assembly" and U.S. Patent Application Ser. No. 60/634,306, filed Dec. 8, 2004 by inventors Alan Trojanowski and Jonathan Nickel and entitled "Dual LED Point-Source Assembly."

BACKGROUND OF THE INVENTION

1. Field of the Invention

The present invention relates generally to a light emitting diode (LED) lighting device. The present invention further relates to an LED assembly having a point-source of light to simulate an incandescent lamp.

2. Description of the Related Art

Reliable safety lights are critical for the safety of boats to prevent accidental collisions during darkness and inclement weather. The vast majority of marine safety lights, such as the one disclosed in U.S. Pat. No. 5,711,591 issued to Jordan use incandescent light bulbs as the light source.

A number of attempts have been made to replace marine filament bulbs with LEDs in marine safety lights because of their relatively small power consumption and long life. Incandescent lamps radiate all of their light on a horizontal plane from the filament in the center of the lamp. This type of source is called a point-source.

Incandescent bulbs have a resistant tungsten filament suspended by support wires with a vacuum inside a glass bulb. As a result, they are highly susceptible to damage due to temperature variations and vibrations. The typical life of incandescent bulbs usually averages one or two thousand hours, so that they must be replaced several times a year.

LEDs, on the other hand, are more efficient than incandescent bulbs at converting electricity into light. LEDs are also more durable and immune to filament breakage due to shock or vibration. Therefore, LEDs have a life span of approximately 50,000 hours versus one to two thousand hours for an incandescent bulb. This means that the bulbs do not have to be replaced nearly so often and do not require much maintenance. This is particularly important for marine lanterns that are difficult to access.

LEDs, however, are not without their problems. Several of these problems are discussed in a paper entitled Design Considerations for Reliability and Optical Performance of LED Signal Lights given by Paul F. Mueller at the XVth IALA Conference, March 2002.

A first problem is that typical, low-output, 5 millimeter LEDs (currently available in lighting devices such as those used for marine and airport safety lights) only have a driving current ranging from about 50 to 70 milliwatts and produce insufficient lumens or candlepower to meet the 3-4 mile visibility requirement. Although it is possible to increase the optical output considerably by increasing the forward current above the nominal rated value, such an increase in forward current generally leads to premature failure of the LED due to overheating of the diode junction. Recently, however, high-output LEDs (driving current of about 1-5 Watt with a high lumens output) have become available.

A second problem is that LEDs have a poorly directed, non-uniform and excessively divergent pencil beam pattern. It is customary to produce a 360° beam pattern of superimposed pencil beams by arraying multiple LEDs in a circular, outward-directed pattern. While this provides an omni-directional beam pattern, lacking further optical enhancement, the result is energy inefficient and grossly non-uniform in horizon intensity.

There are several major manufacturers that produce marine lanterns with LEDs including: Carmanah Technologies, Inc., Zeni Buoy Light Company Limited, Vega Industries Limited, Tideland Signal Corporation, and Sabik Oy. All of the currently available marine lanterns using LEDs use low output LEDs. Thus, all of these lanterns require large numbers, up to several hundred, of LEDs to produce the minimal total flux (lumens or candlepower) necessary for a marine lantern.

Marine LED lanterns use multiple arrays of multiple LEDs that do not have a single point source of light and cannot use a fresnel lens to capture and focus the light from the LED arrays used. All five of the manufacturers mentioned above have been required to design new lenses to capture and focus the light from their LED arrays. One approach to this problem has been to design a fine lens incorporated in front of the LEDs to converge the beam of light and increase the luminance thereof. For example, U.S. Pat. No. 5,224,773 discloses a thin fresnel lens made by rolling and welding the edges of a thin, transparent film of acrylic resin with a fine-pitched surface that is formed by heating and pressing a mold for a thin linear fresnel lens to form a cylinder.

Alternatively, U.S. Pat. No. 6,048,083 issued to McDermott describes an optic lens that is contoured to create a plurality of focal points which form a bent or crooked focal line cooperate with the orientation of the LED elements to project a composite light beam with limited divergence about a first reference plane.

Another approach has been to construct a small marine safety light that has a much lower candlepower. U.S. Pat. No. 6,086,220 issued to Lash et al. describes a marine safety light having six or more low output LEDs having a uniform star configuration. The inventors determined that such an LED array produced visible light over one nautical mile away from the vessel, whereas most marine lanterns must meet a 60 candela requirement for a three to four mile visibility.

There is an existing need for a lighting device that replaces the incandescent bulb with LEDs that have sufficient candlepower and that provides an omni-directional beam pattern. A point-source LED light-source assembly is desirable for retro-fitting existing lanterns and lenses designed for point-source lighting.

SUMMARY OF THE INVENTION

A lighting device is described having an LED light source assembly that creates a point-source of light to simulate an incandescent lamp.

One aspect of the present invention is a lighting device comprising: (a) a single stack of two LED modules; (b) each LED module having an LED, an LED lens and an LED mount made of a thermally conductive material to conduct heat away from the LEDs; (c) a power supply; and (d) a fresnel lens surrounding the lighting assembly; whereby light emanating from the LEDs passes through the cover and the fresnel lens to provide a substantially uniform horizontal plane of light.

Another aspect of the present invention is a lighting device comprising: (a) a stacked pair of LED modules, each LED module comprising an LED attached to a thermally conductive mount on a first side and to an LED lens on a second opposed side, wherein the LED lens attached to one LED abuts the LED lens attached to the other LED; (b) a power source for providing electrical power to the stacked pair of LED modules; and (c) a hollow, approximately cylindrical member positioned around the stacked pair of LED modules.

Yet another aspect of the present invention is device including a stacked pair of LED modules, wherein each LED module comprises: an LED having a driving current of at least one Watt, a thermally conductive mount having a first side of the LED mounted on one side of the mount, and a trapezoidal LED lens mounted on a second side of the LED, wherein the LED lens attached to the LED of one LED module adjoins the LED lens mounted to the other LED.

The foregoing has outlined rather broadly several aspects of the present invention in order that the detailed description of the invention that follows may be better understood and thus is not intended to narrow or limit in any manner the appended claims which define the invention. Additional features and advantages of the invention will be described hereinafter which form the subject of the claims of the invention. It should be appreciated by those skilled in the art that the conception and the specific embodiment disclosed may be readily utilized as a basis for modifying or designing of the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
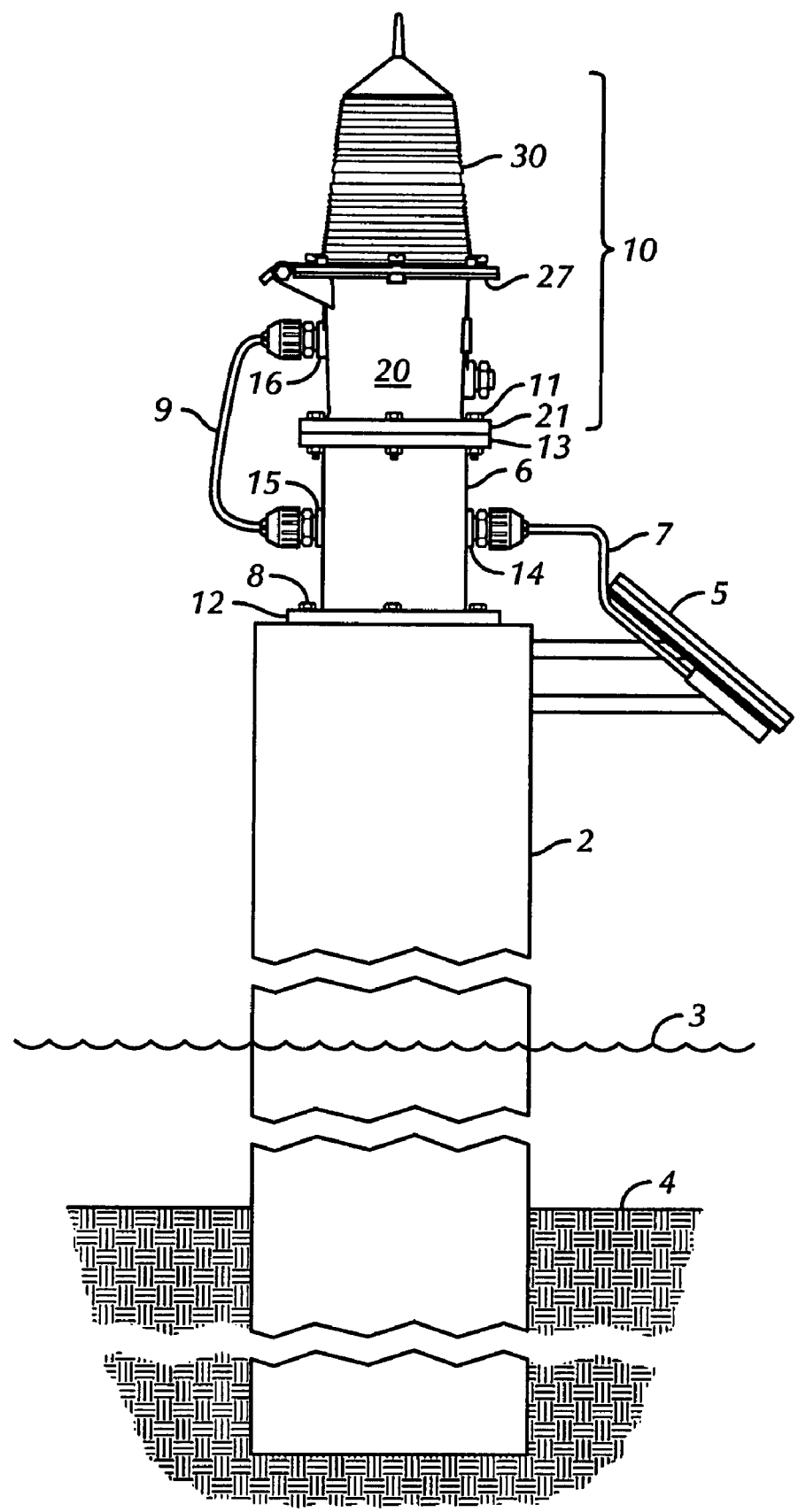
FIG. 1 is a plan view in partial section of a typical installation of a lighting device of the present invention mounted on a marine piling.

Several embodiments of the lighting device of the present invention are described in detail below. One embodiment of the present invention relates to a lighting device using high-flux light emitting diodes (LEDs) mounted on heat sinks facing each other and located in a conventional fresnel lens. High flux LEDs are defined herein as LEDs with driving current of about 1-5 Watts and having a high output of lumens. This embodiment is described below.

Referring now to the drawings, it is noted that like reference characters designate like or similar parts throughout the drawings. The figures, or drawings, are not intended to be to scale. For example, purely for the sake of greater clarity in the drawings, wall thicknesses and spacings are not dimensioned as they actually exist in the assembled embodiments.

Figure 2:
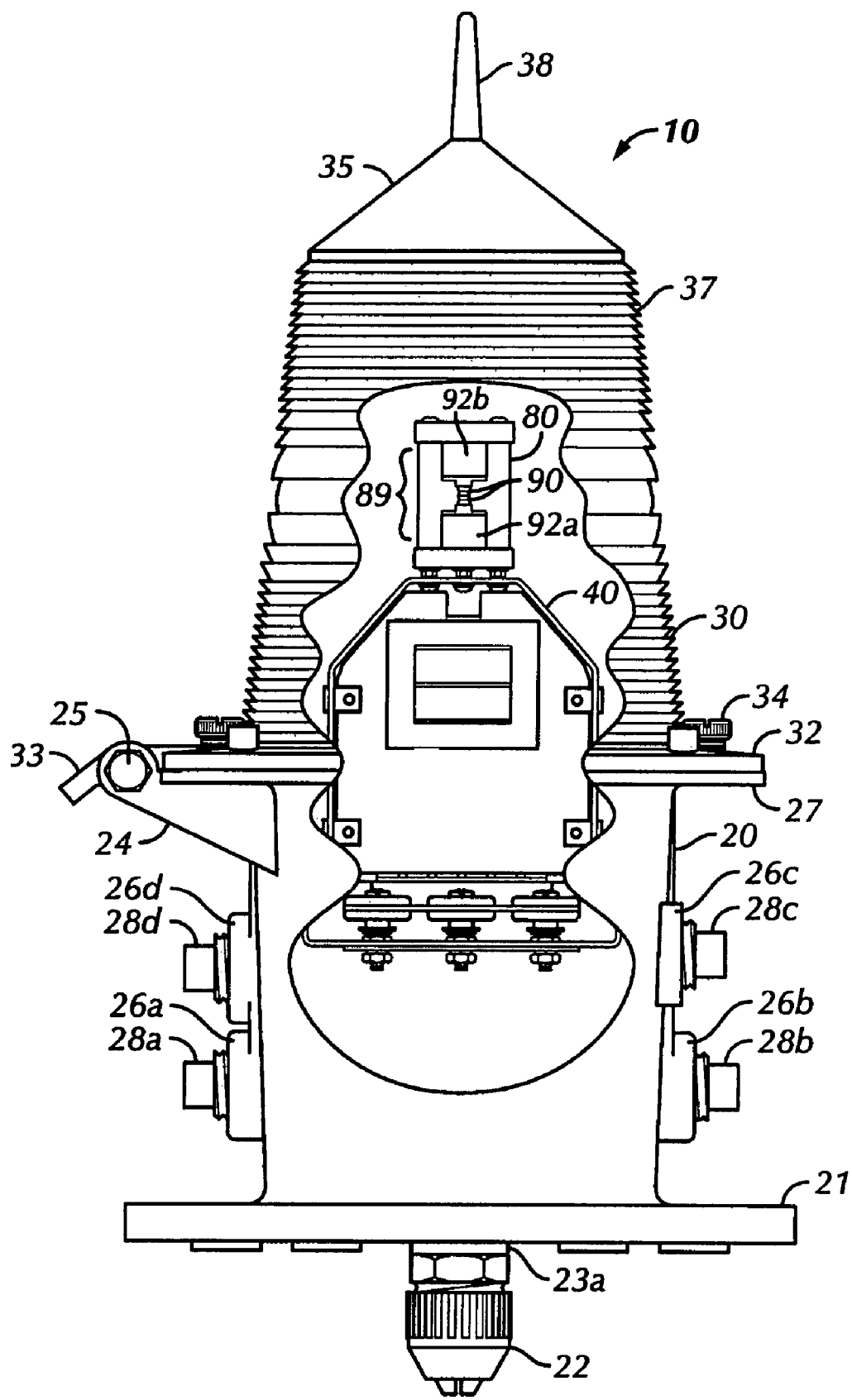
FIG. 2 is a profile view, partially in section, showing the LED source module of the lighting device and its mounting base.

As shown in FIG. 2,4,6, the preferred embodiment has two, side-emitting LEDs $91a,b$ facing each other with only LED lenses $99a,b$ between them. By having this orientation, all of the light radiating from the LEDs $91a,b$ originates from a single point in space and the light produced is substantially horizontally uniform in all directions.

One preferred embodiment of a lighting device 10 of the present invention, shown in FIGS. 1 and 2, is often installed on bridges, offshore platforms, airport towers, marine beacons, and the like. FIG. 1 illustrates an example of the lighting device 10 installed as a marine beacon. This type of installation is commonly used on remote channel markers for navigable waterways. A piling 2 of treated wood, concrete, pipe or other applicable material is driven into the soil below a mudline 4 to support the lighting device 10 high enough above a water surface 3 to prevent the lighting device 10 from being damaged by wakes, waves, and the like.

The lighting device 10 is optionally powered by batteries (not shown) contained in a tubular battery case 6 that has a closed bottom flange 12 and an annular top flange 13. The lighting device 10 is mounted to the top of the battery case 6 with base attachment bolts 11 and the battery case 6 is attached to the top of the piling 2 with bolts 8. In this embodiment, the batteries located in the interior of case 6 are recharged by electricity generated by a solar panel assembly 5 and transferred to the batteries via a solar collector cable 7 as shown in FIG. 1. The cable 7 penetrates into the side of case 6 through a sealing fitting 14. The solar panel assembly 5 is mounted on the piling 2 or, alternatively (not shown), on battery case 6.

A power cable 9 emerges from a sealing fitting 15 in the side of case 6 to transfer electricity from the battery case 6 to the lighting device 10. In the embodiment shown in FIG. 1, the power cable 9 enters the side of a mounting base 20 of lighting device 10 through a sealing fitting 16. As an alternative, the power cable 9 could be attached to a fitting 22 at the bottom of the lighting device 10 (as shown in FIG. 2) to transfer electricity from the battery case 6 to the lighting device 10. Without departing from the spirit of the invention, the electrical power also could be supplied by other configurations such as from a remote external source via a supply cable (not shown). In other configurations, the battery case 6 and/or the solar panel assembly 5 could be omitted or modified to work with a different exterior power supply (not shown).

Unless noted as being made of specific materials, the lighting device 10 of the present invention can be made of a variety of materials as long as the materials meet the desired performance specifications. The preferred construction materials for structural items of the lighting device are steel or aluminum alloy.

Figure 3:
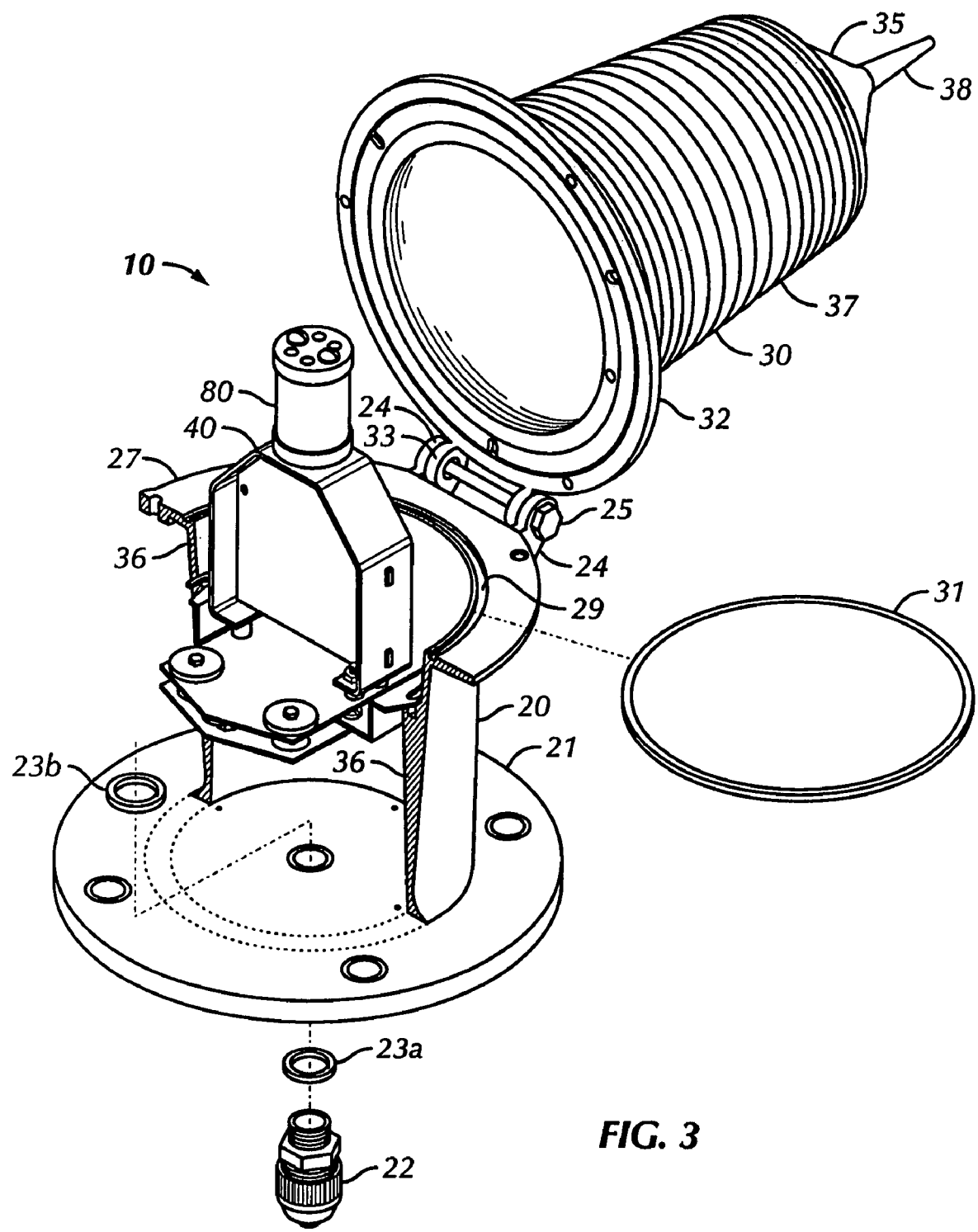
FIG. 3 is a partially exploded oblique view, partially in section, showing one embodiment of the mounting of the LED source module on the mounting base.

FIG. 2-3 show general details of the lighting device 10 and specifically the interrelationship of the mounting base 20, a lantern lens assembly 30 and a light-emitting diode (LED) source assembly 80 (FIG. 3) which is the source of the light from the lighting device 10. The mounting base 20 is a tubular, substantially right-circular cylinder with a right circular cylindrical lower transverse blind mounting flange 21 and a transverse annular top flange 27. The mounting base 20 is typically a painted aluminum casting and its approximately cylindrical wall surfaces are slightly conical in shape to provide draft for the extraction of the casting patterns (not shown). A bolt circle of holes in the mounting flange 21 accommodate bolts 11 so that mounting base 20 can be bolted to corresponding tapped holes in the battery case 6 (FIG. 1).

The mounting flange 21 has an axial tapped hole, which mounts a commercially available sealing cable fitting 22 so that a power cable (not shown) can enter the lighting device 10 through the bottom of the mounting base 20 instead of the side of the mounting base 20 as shown in FIG. 1. Annular gasketed sealing washers 23a,b seal the exterior and the interior respectively of the joint between fitting 22 and flange 21 (FIG. 3). In the arrangement shown in FIG. 2, the sealing cable fitting 22 extends downwardly into the battery case 6 and serves to isolate the interior of the mounting base 20 from potentially corrosive conditions within the battery case 6.

Mirror image hinge brackets 24, extending outwardly from the exterior of mounting base 20 adjacent to the top flange 27, are symmetrically offset from a vertical plane through the axis of the mounting base 20 and have coaxial hinge holes (not shown) normal to the vertical plane. The axis of the hinge holes in hinge brackets 24 is approximately at the level of the upper surface of top flange 27. A hinge pin 25 consists of a bolt and nut and is mounted through the hinge holes of hinge brackets 24.

External threaded bosses 26a,b,c,d (FIG. 2) on the approximately cylindrical outer wall of mounting base 20 are drilled and tapped for alternative power cable entry locations (such as shown in FIG. 1), which are shown sealed with threaded plugs 28a,b,c,d, but which could likewise be used to mount the sealing cable fitting 22.

The upper transverse face of top flange 27 has a concentric O-ring groove 29 for mounting a face-sealing O-ring 31 (FIG. 3). Additionally, top flange 27 is provided with a concentric bolt circle of tapped holes.

Mirror-image, inwardly projecting bosses 36 with transverse upper shoulders are located in the bore of mounting base 20. These bosses 36 are provided with drilled and tapped mounting holes parallel to the axis of mounting base 20 in order to mount a controller assembly 40 of the lighting device 10.

The lantern lens assembly 30 is positioned on top of and coaxially with mounting base 20. A lens base 32 is an annular ring flange with a concentric bolt circle of holes corresponding to that of the top flange 27 of mounting base 20 and having a shallow counterbore on its under side. Radially projecting to one side of lens base 32 is a lens hinge 33, which constitutes a rectangular tab having at its outer end a transverse eye hole formed in an outer end enlargement. The axis of the eye hole of lens hinge 33 is aligned with the transverse hinge holes in hinge bracket 24 of mounting base 20 when the lantern lens assembly 30 is aligned with and resting on the top flange 27 of the mounting base 20.

A thin-walled lens body 35 has, from its lower end, an annular flange, a slowly tapering elongated large diameter frustro-conical main body portion, a short frustro-conical transition section of intermediate diameter, and a sharp small diameter conical bird spike 38 section at its top. All of the conical sections taper upwardly. The function of the bird spike 38 is to discourage birds from perching on and fouling the lens body 35.

The exterior of the main portion of lens body 35 both above and below a central portion (termed the "bulls eye" and shown in FIG. 2) is annularly grooved in a mathematically determined pattern which constitutes a standard fresnel lens 37 of the type conventionally used to focus light from a centrally located point or point source into a horizontal beam. The pattern of the annular grooves is approximately mirror imaged about the midplane of the bulls eye, but with slight modifications due to the conical pattern of the lens body 35.

The lens body 35 is positioned coaxially with lens base 32 with the bottom flange of the lens body retained within the counterbore of the lens base 32 and held so that the bottom flange of the lens body 35 may be clamped against the top flange 27 of the mounting base 20. The O-ring 31 (FIG. 3) is positioned in the groove 29 of the mounting base 20 and seals between the lens body 35 and the mounting base 20. After the lens body 35 is positioned against the top flange 27, lens closure screws 34 are positioned in the bolt circle holes of lens base 32 and screwed into the threaded bolt circle holes of the top flange 27 of the mounting base 20, so that the lantern lens assembly 30 is firmly mounted to the mounting base 20.

Figure 4:
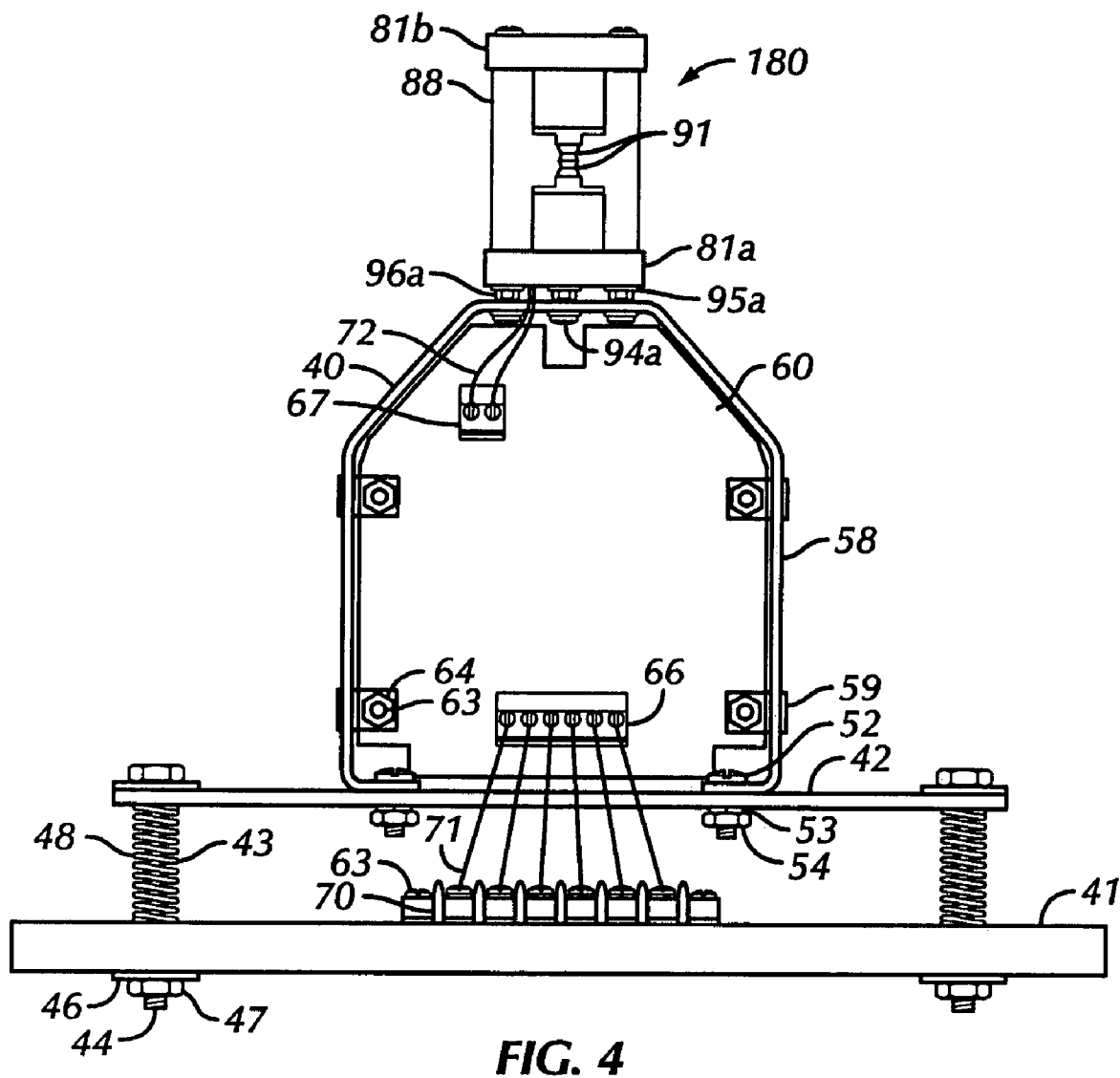
FIG. 4 shows a profile view showing details of the mounting of the controller assembly and the LED source assembly.
Figure 5:
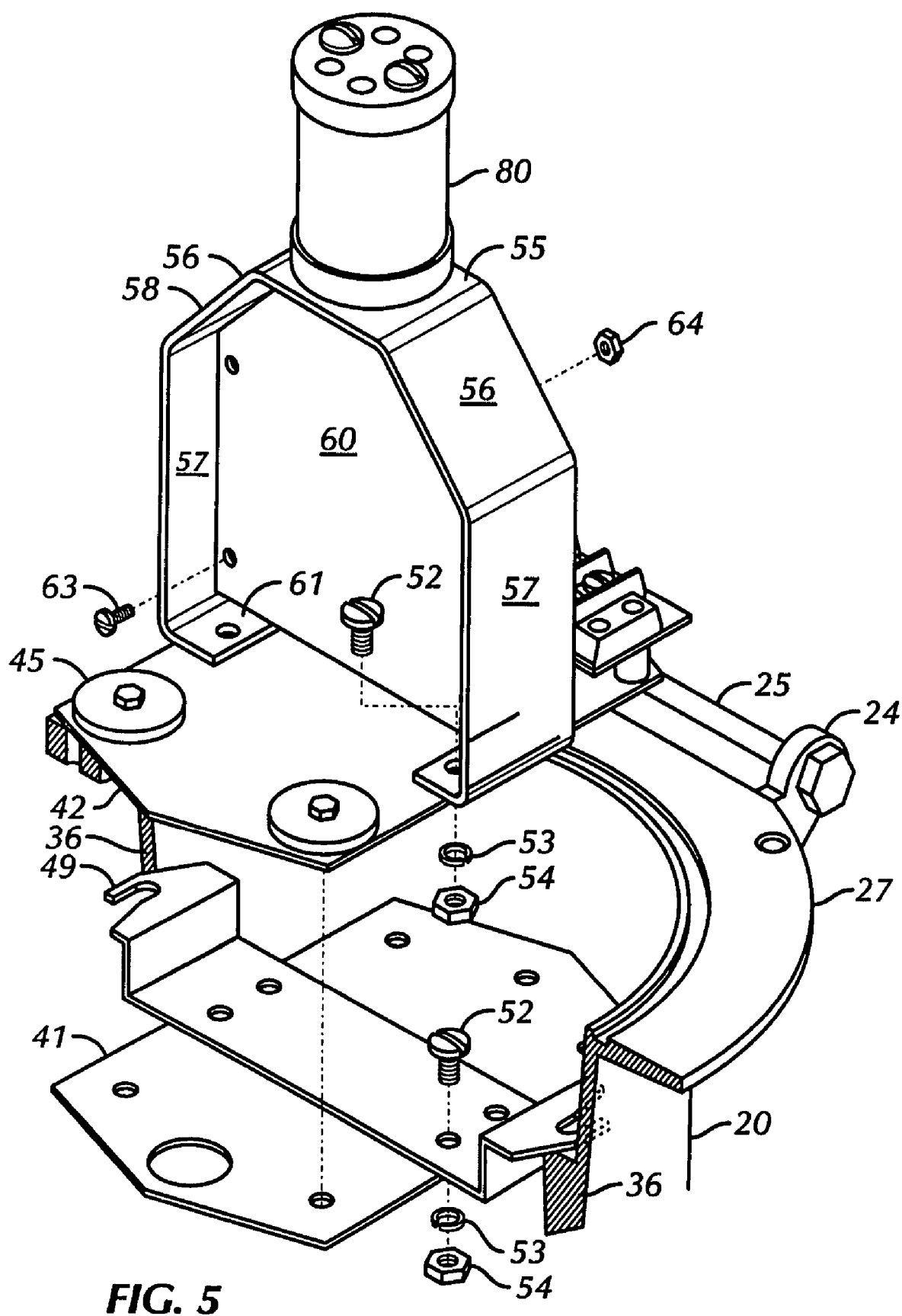
FIG. 5 is a partially exploded oblique view, partially in section, showing details of the mounting of the controller assembly for the lighting device.

In FIGS. 4 and 5, the structure of one embodiment of the controller assembly 40 is shown. FIG. 4 is a profile view showing the details of the shock resistant mounting of the controller assembly 40. The controller assembly 40 serves to provide appropriate, conditioned electrical power and, if desired, a programmable blinking pattern for the LEDs 91a,b (described below).

A base plate 41 in the preferred embodiment is a thin flat steel plate of hexagonal shape and dual symmetry with multiple mounting holes and access holes cut into it so that other components can be mounted to it and the mountings for other components can be accessed. A carrier plate 42 is similar to base plate 41, but with a different pattern of mounting holes and access holes. The carrier plate 42 is positioned parallel to and above the base plate 41. Three or more spring mount assemblies 43 with their axes not lying on a common line are positioned in mounting holes on corresponding corners of the base plate 41 and the carrier plate 42 to support the carrier plate 42. Four spring mount assemblies 43 are used in the preferred embodiment, two of which are shown in FIG. 4. The spring mount assembly 43 consists of a spring mount screw 44 with, in sequential order from the upper end, the head of the screw 44, a flat washer 45, the carrier plate 42, a standoff spring 48, the base plate 41, a washer 46 and a nylon insert lock nut 47. Washers 45-46, the spring 48 and the nut 47 are concentric with the screw 44. The nut 47 is sufficiently threaded onto the screw 44 so that the spring 48 is preloaded in compression.

As shown in FIG. 5, a U-bracket 49 is formed from a strip of thin plate approximately 2 inches wide that has two outwardly projecting coplanar ears, each adjoining a symmetrical vertical leg, and a central horizontal section supported by the vertical legs. The outer ends of the ears of bracket 49 have similar but oppositely facing parallel slots transverse to the longitudinal mid-plane of the U-bracket 49. This is to allow the U-bracket 49 to be readily slipped in and out of engagement with vertically projecting headed screws (not shown) mounted on the interior bosses 36 of mounting base 20 by rotating it about its vertical axis without removal and reinstallation of the screws. The U-bracket 49 is in turn rigidly mounted to the interior bosses 36 in the bore of the mounting base 20 by means of screws engaged in its slots.

Two sets of mounting holes for attaching the base plate 41 are located at either side of the central horizontal section of U-bracket 49. Base plate 41 is rigidly mounted in its center to the lower side of U-bracket 49 by screws 52, lock washers 53, and nuts 54 at two sets of holes on opposed sides of its central portion corresponding to the mounting holes in the central portion of bracket 49.

A printed circuit board (PCB) bracket 58 (FIG. 4 and 5), formed from a thin strip of plate, is symmetrical about its vertical mid-plane perpendicular to the plate strip longitudinal axis. The PCB bracket 58 has a horizontal central upper section 55 adjoined by two inclined segments 56, which are in turn attached to vertical legs 57 that have inwardly projecting horizontal mounting tabs 61 on their bottom ends. The PCB bracket 58 is mounted in a central position to the carrier plate 42 by means of two other sets of screws 52, lock washers 53 and nuts 54.

Three mounting holes (not shown) for the LED source assembly 80 are provided on the horizontal central upper section 55 of PCB bracket 58. One hole is in the middle of the horizontal central upper section 55 and two others are symmetrically placed straddling the first hole.

Multiple PCB mounting tabs 59 are mounted in transverse slots pierced in the thin plate of bracket 58 and welded or soldered in place. A controller PCB 60 is a flat construction of conventional printed circuit board material having a shape that closely fits within the interior of the PCB bracket 58

If the incoming electrical power is AC, then it is rectified to DC on the controller PCB 60. The input current and voltage are adjusted and regulated to provide appropriate polarities, voltages, current limits, power levels, and timing of any blinking functions desired for individual LED modules 90 in the LED source assembly 80.

The controller PCB 60 is mounted to the tabs 59 by means of screws 63 and nuts 64. A PCB controller terminal strip 66 is rigidly mounted onto the lower end of the controller PCB 60 and the individual terminals of the PCB terminal strip 66 are attached to appropriate conductor paths on the controller PCB 60. Similarly, in the preferred embodiment, a light emitting diode (LED) power terminal 67 for each of the LED modules 90a,b is mounted at the upper end of the controller PCB 60 and interconnected to appropriate circuit conductor paths on the printed circuit board.

A base terminal strip 70 is rigidly mounted to the upper surface of the base plate 41 by means of screws 63 engaged in tapped holes in the base plate 41. Alternatively, the base terminal strip 70 may be similarly mounted to the carrier plate 42. Main leads 71 are discrete insulated wires that are each connected at their first end to one of the terminals of the base terminal strip 70 and at the second end at its corresponding terminal on the PCB terminal strip 66.

Multiple embodiments of the LED source assembly 80 are possible and several (80, 180, 280, 380 and 480) are described below. The first embodiment of the LED source assembly 80, shown in the cross-sectional view of FIG. 6, consists primarily of housing elements for an LED assembly 89. This embodiment is suitable for use with five Watt high flux LED sources.

The lower base 81a is a right circular disk having a central axial through the threaded hole 86 and a concentric annular O-ring face seal groove 82a having a depth in excess of that necessary to properly house an O-ring 83a (FIG. 6) on its upper surface. The base 81a preferably has an array of multiple vent holes similar to those shown in the upper base plate 81b in FIG. 8. The threaded holes 86 provide an optional mounting for the LED source assembly 80. All of the holes are parallel to the axis of the base 81a. The threaded holes 86 are spaced similarly to those straddling the central hole on the horizontal central upper section of the bracket 58. The lower base 81a also has an extended heat sink portion to assist in dissipating heat from the LEDs 91a,b.

Figure 6:
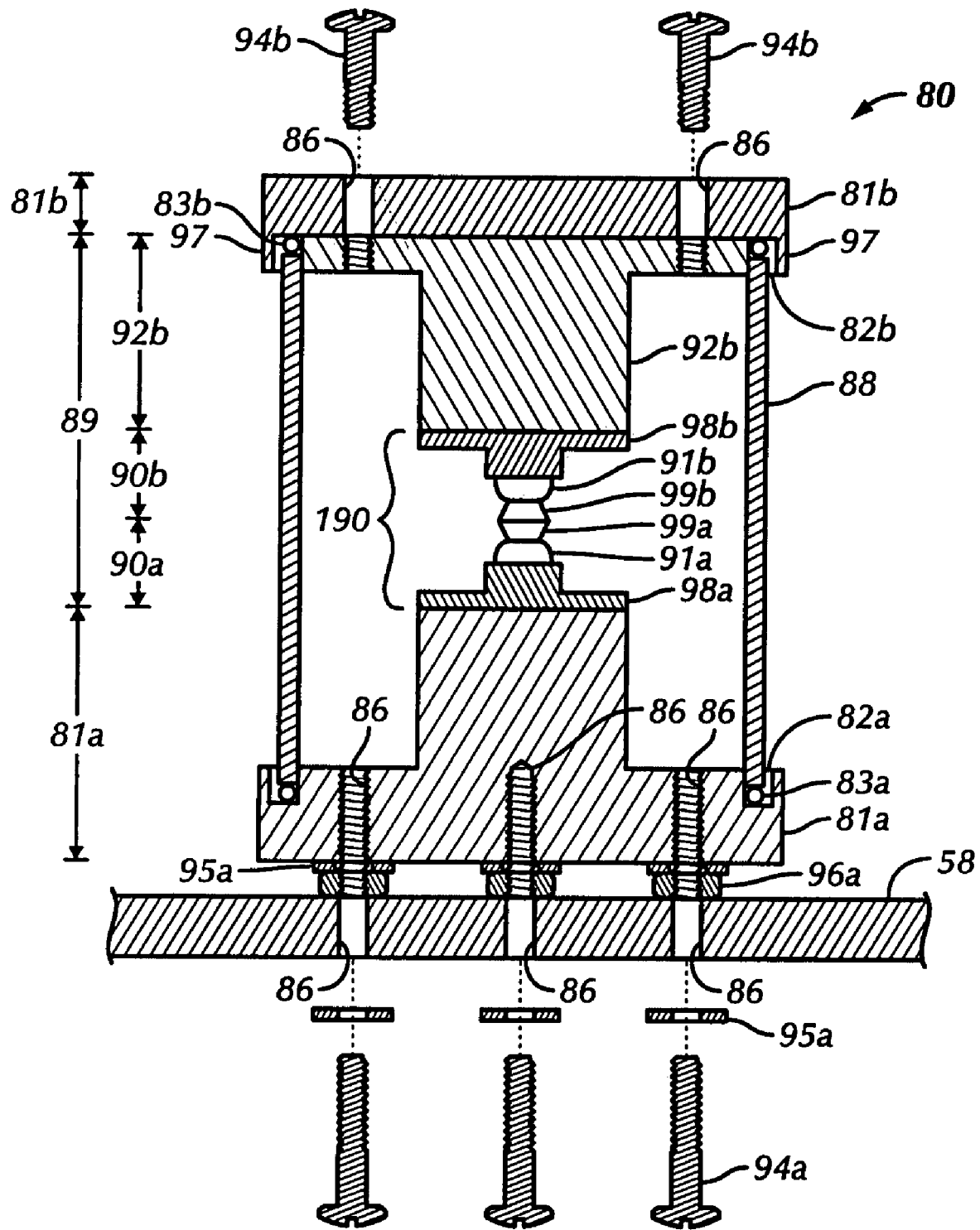
FIG. 6 is a cross-sectional view of one embodiment of the LED source assembly having a dual-LED point-source assembly.

An upper base 81b, which is inverted relative to the lower base 81a, is substantially identical to the lower base 81a except that the threaded holes 86 are now optional and a heat sink 92b in the upper portion is separate from, but firmly connected to, the upper base 81b. An O-ring groove 82b in the upper base 81b houses an O-ring 83b (FIG. 6).

Uniform light dispersion occurs when using the stacked, high-flux LEDs 91a,b with LED lenses 99a,b attached to the upper and lower portion of the LEDs 91a,b. Therefore, no diffuser is required to redistribute the light emitted from the LEDs 91a,b. This feature of the present invention, in combination with the other aforementioned features, provides the characteristics necessary for enabling a compact LED lighting device 10 such that it can be used for new installations as well as for retrofitting the population of existing lighting devices designed for incandescent bulb sources (not shown).

The surfaces of the lenses 99a,b are able to refract light emanating from the LEDs 91a,b in such a manner that the intensity of the light emitted from the LEDs 91a,b, as measured in spherical coordinates, is substantially uniformized for the angles of admissivity of the fresnel lens 37 (FIG. 2) in combination with the LED source assembly 80.

The upper base and the lower base are held together using any means known in the art. A preferred mechanism for securing the LED source assembly 80 is a cover 88, as shown in FIG. 6, is a right circular thin-walled tube made of glass or any other material that is clear, heat resistant and satisfies the structural requirements of the cover 88. The inner diameter of the cover 88 is greater than the inside diameter of the O-ring groove 82a, and the outer diameter of the cover 88 is a close fit to the inner diameter of groove 82a so that the cover 88 may be positioned concentrically with the base 81a.

In this embodiment, LED modules 90a,b each include an LED mount 98, the LED 91 and the LED lens 99; and the LED assembly 89 includes the lower LED module 90a and the upper LED module 90b that are attached at their respective LED lenses 99a,b as shown in FIG. 6. The LED mount 98a for the lower LED module 90a is attached to a lower base 81a that is made of a material such as aluminum to provide heat sink capabilities. The LED mount 98b for the upper LED module 90b is attached to a heat sink 92b, which in turn attaches to an upper base 81b via screws 94 as shown in FIG. 6. The clear cover 88 in the shape of a cylindrical body encloses the LED assembly 89 to protect the LEDs from moisture. If, however, the fresnel lens 37 seals the LED source module, the cover 88 is not required and other configurations can be used.

The LED lenses 99a,b can be made of a variety of materials and in various shapes. A preferred embodiment of the lenses 99a,b is constructed in a trapezoidal shape of an optically transparent material. One of the parallel sides of the trapezoid is attached to one side of one LED and the other parallel side is abutted flush with the corresponding parallel side of the other lens (see FIG. 6).

Each of the LEDs 91 is attached to its respective LED mount 98a,b with an adhesive such as Loctite Product Output 315, which is a high temperature thermally conductive one-part acrylic adhesive, or a one or two-part epoxy. If an epoxy is used it is preferably compounded with a filler such as aluminum nitride or silver to enhance the thermal conductivity of the adhesive bond so that it will readily conduct heat into the heat sinks 81a and 92b of the LED source assembly 80.

Each of the LED modules 90a,b is connected (not shown) to a power supply so that electric power can be transmitted to the LED modules 90a,b and then to the LEDs 91a,b for the lighting device 10.

The entire LED source assembly 80 is arranged in the following pattern from the bottom to the top. The lower base 81a has the LED assembly 89 concentrically placed with the bottom of the first LED module 90a in firm contact with the upper surface of base 81a. In the LED assembly 89, the second LED module 90b is inverted and positioned on top of the first LED module 90a such that the tops of the two LED lenses 99a,b are in firm contact with each other and the heat sink 92b is attached to the top of the LED assembly 89. The upper base 81b is then concentrically placed relative to lower base 81a where its grooved lower surface is in firm contact with the top of the heat sink 92b of the LED assembly 89. The firm contact ensures good thermal conductivity across the connections and permits heat absorbed by the heat sinks 81a and 92b to flow through the bases 81a,b and dissipate into the environment. The firm contact is maintained by using screws 94b to clamp the upper base 81b to the heat sink 92b and screws 94a to clamp the entire LED source assembly 80 to the bracket 58 as shown in FIG. 4.

Before assembly, the O-ring 83a (FIG. 6) is placed in the groove 82a of the lower base 81a and the O-ring 83b is placed in the groove 82b of the upper base 81b. The cover 88 is then positioned between and concentric with the two bases 81a,b. The cover 88 extends into the grooves 82a,b when the screws 94a are tightened such that the O-rings 83a,b are compressed sufficiently to provide sealing but are not over compressed.

High flux LEDs produce substantial heat compared to lower power LEDs used in earlier beacon devices and marine and airport safety devices. The present invention uses heat sinks 81a and 92b to transfer heat away from the LEDs 91. This dissipation of the resultant heat buildup within the lighting device 10 prevents a precipitous reduction in service life for the LEDs 91. The aluminum structures (LED mounts 98a,b), upon which the LEDs 91 of the present invention are mounted, function as heat sinks so that much of the heat is transferred by conduction to regions in the lighting device 10 that are remote from the LEDs 91 and then transferred to the environment by convection and radiation.

An air circulation path exists between the lower base 81a and bracket 58 due to the gap created by the presence of a washer 95a and a nut 96a (see FIG. 6). Cooling air thus can circulate as a result of thermally induced convection in through vent holes (not shown) in the base 81a, between LED assembly 89 and cover 88, and out through vent holes in the upper base 81b. Alternatively, the LED source assembly 80 may be sealed to protect the LEDs 91 from moisture and other contaminants. Whenever the LED assembly 89 is sealed, the conduction of generated heat through the heat sinks 81a and 92b to the environment is even more important.

The preferred embodiment has an LED unit 190 with two LED modules 90a,b stacked vertically such that they are facing each other as shown in FIG. 6. Each LED module 90a,b contains one LED 91, one LED lens 99 and one LED mount 98. The connection point of the two LED modules 90a,b (where the lenses 99 are attached to each other) is located at the focal height of the fresnel lens 37 that produces the peak intensity.

Figure 7:
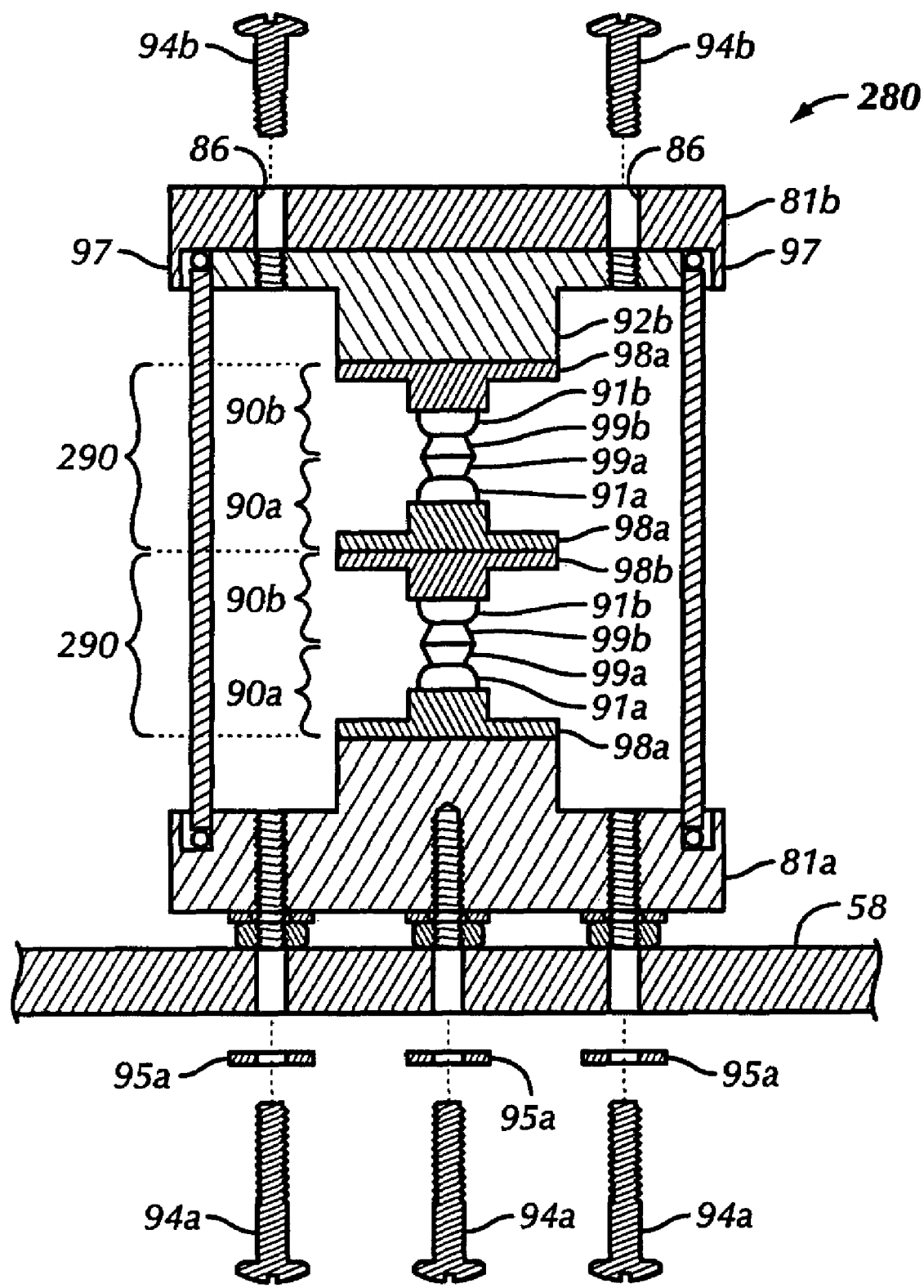
FIG. 7 is a cross-sectional view of a dual stack LED source assembly.

A second embodiment of an LED source assembly 280, shown in FIG. 7, is designed to be a direct replacement for that used in the first embodiment (element 80 in FIG. 6), so that it can be directly mounted to the top of the U-bracket 58 and be operated by the same controller assembly 40 and use the same mounting base 20 and lantern lens assembly 30. The LED source assembly 280 of this embodiment utilizes the same upper base 81b, O-rings 83a,b, and cover 88 as were used in the first embodiment of the LED source assembly 80. For the second embodiment, an LED source assembly 280 has the same height as the LED source assembly 80 of the first embodiment, but the construction differs as explained below. This embodiment provides greater lumens due to the use of two LED units 290 instead of the single LED unit 180 in the first preferred embodiment.

To obtain space for the second LED unit 290, the heat sink 292b in the top portion of the LED source assembly 280 and the heat sink in a lower base 281a are smaller than their corresponding parts in the LED source assembly 80. The two LED units 290 are firmly attached to each other.

Figure 8:
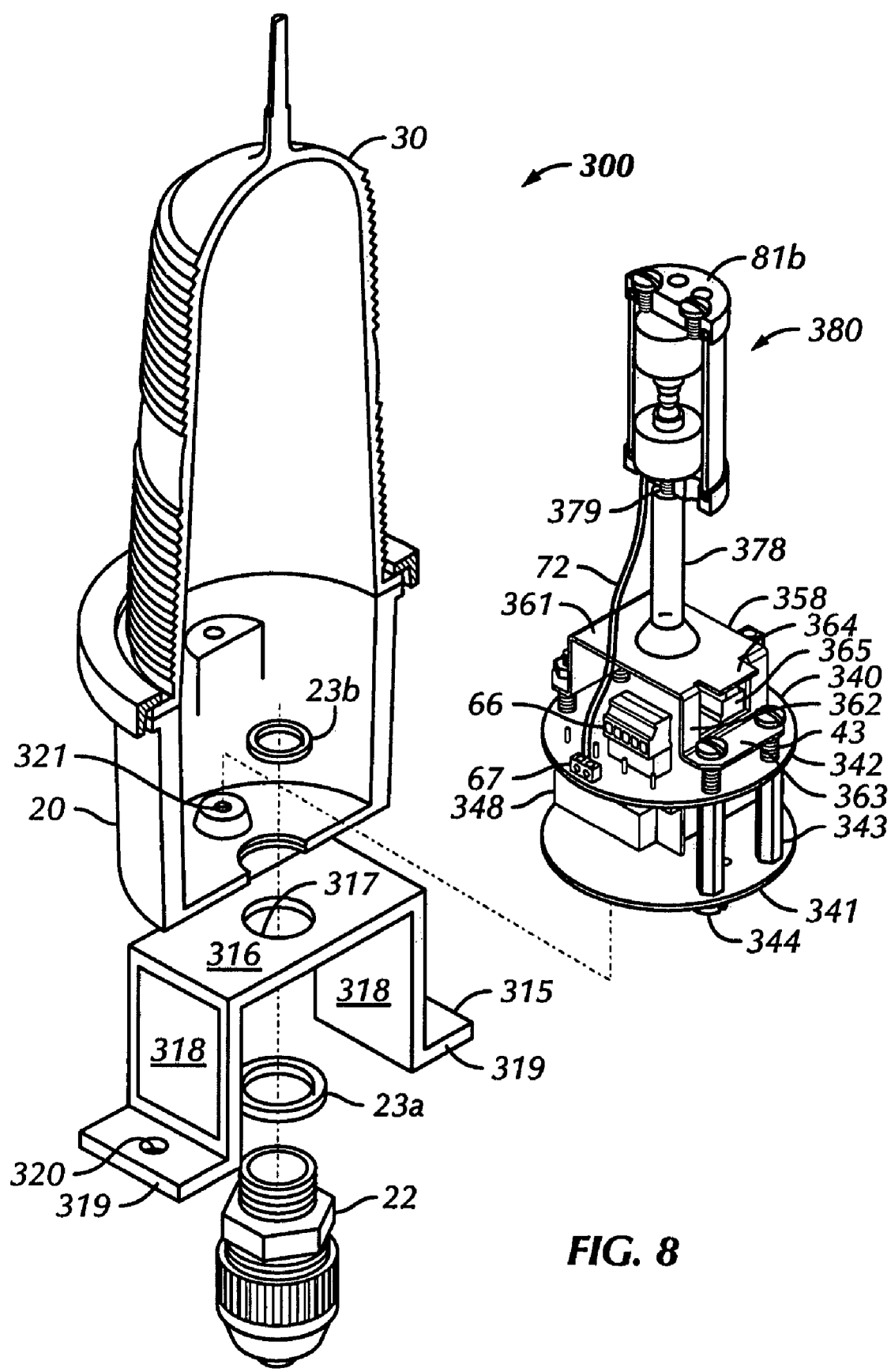
FIG. 8 is a partially exploded oblique view, partially in section, showing details of an alternative embodiment of the controller assembly of an LED source assembly.

Another embodiment of a lighting device 300 of the present invention is shown in an oblique, partially exploded, sectional view in FIG. 8. In this embodiment, the mounting base 20, the lantern assembly 30, and the sealing cable fitting 22 are the same as in the first embodiment shown in FIG. 1-2. The lighting device 300, in this embodiment, is mounted on a hat-shaped bracket 315 with the sealing cable fitting 22, which is screwed into the bottom of the mounting base 20 by means of its central threaded hole and sealed by the gasket 23a between the fitting 22, the mounting base 20, and the bracket 315. The hat-shaped bracket 315 has an elevated horizontal central portion 316 with a central vertical axis hole 317 for the fitting 22, symmetrical vertical legs 318, and outwardly extending horizontal ears 319 with mounting holes 320 for attachment to a supporting piling (not shown). The input power cable (not shown) for the lighting device 300 enters the interior of the lighting device 300 via the sealing fitting 22. This arrangement, without a battery box or solar collector, is typically used with a remote AC power source.

While a controller assembly 340 performs substantially the same functions as the controller assembly 40 in the first embodiment of the lighting device 10, the controller assembly 340 is configured differently. A base plate 341 is a thin circular plate which is attached by screws in holes in the plate 341 to coaxial threaded holes in multiple bosses 321 which are on the upper side of the bottom transverse bulkhead of the mounting base 20. A carrier plate PCB 342 is a thin circular printed circuit board (PCB) similar in its geometry to the base plate 341. It is mounted coaxially with and spaced apart above plate 341 by multiple identical standoffs 343, screws 344 on the connection of the standoffs with plate 341, and the screws of spring mount assemblies 43 for the connection of the standoffs with the carrier plate PCB 342. Similar holes are provided on the same pattern on the periphery of each of plates 341 and 342 in order to accommodate the screws 344 attaching to the standoffs 343.

The carrier plate PCB 342 mounts a power supply assembly 348 on its lower side for rectifying AC power to DC if necessary and conditioning the power output of the power supply 348 by providing voltage stepdown and regulation. The power supply 348 also provides appropriate polarities, current limits and surge protection as required. The other individual components of the carrier plate PCB 342 are not shown, but are substantially similar to those employed in the control circuitry of the conventional incandescent light beacon device sold by Automatic Power, Inc., Houston, Tex.

The carrier plate PCB 342 also provides the timing of any typical blinking functions desired for the type of LED light source used. The PCB controller terminal strip 66 is rigidly mounted onto the upper side of the carrier plate PCB 342 on one side and the individual terminals of the PCB terminal strip 66 are attached to appropriate conductor paths on the carrier plate PCB 342.

A hat-section bracket 358 is centrally mounted above the carrier plate PCB 342 with spring mount assemblies 43 so that the bracket 358 is shock isolated from the rest of the controller assembly 340. The bracket 358 has a horizontal central section 361, two similar, parallel vertical sides 362, and coplanar outwardly projecting mounting ears 363. Multiple holes coaxial with similar holes in the carrier plate PCB 342 serve to provide mounting locations for the spring mount assemblies 43. A tab 364 is cut out of the central portion of one of the vertical sides 362 by making cuts on the vertical sides and bottom of the tab 364. The tab 364 is then bent upwardly so that it projects horizontally as a projection of the central horizontal section 361 of the bracket 358. A hole is punched close to the hinge line for the tab 364 and a super capacitor 365 is mounted therein.

Figures 9, 10:
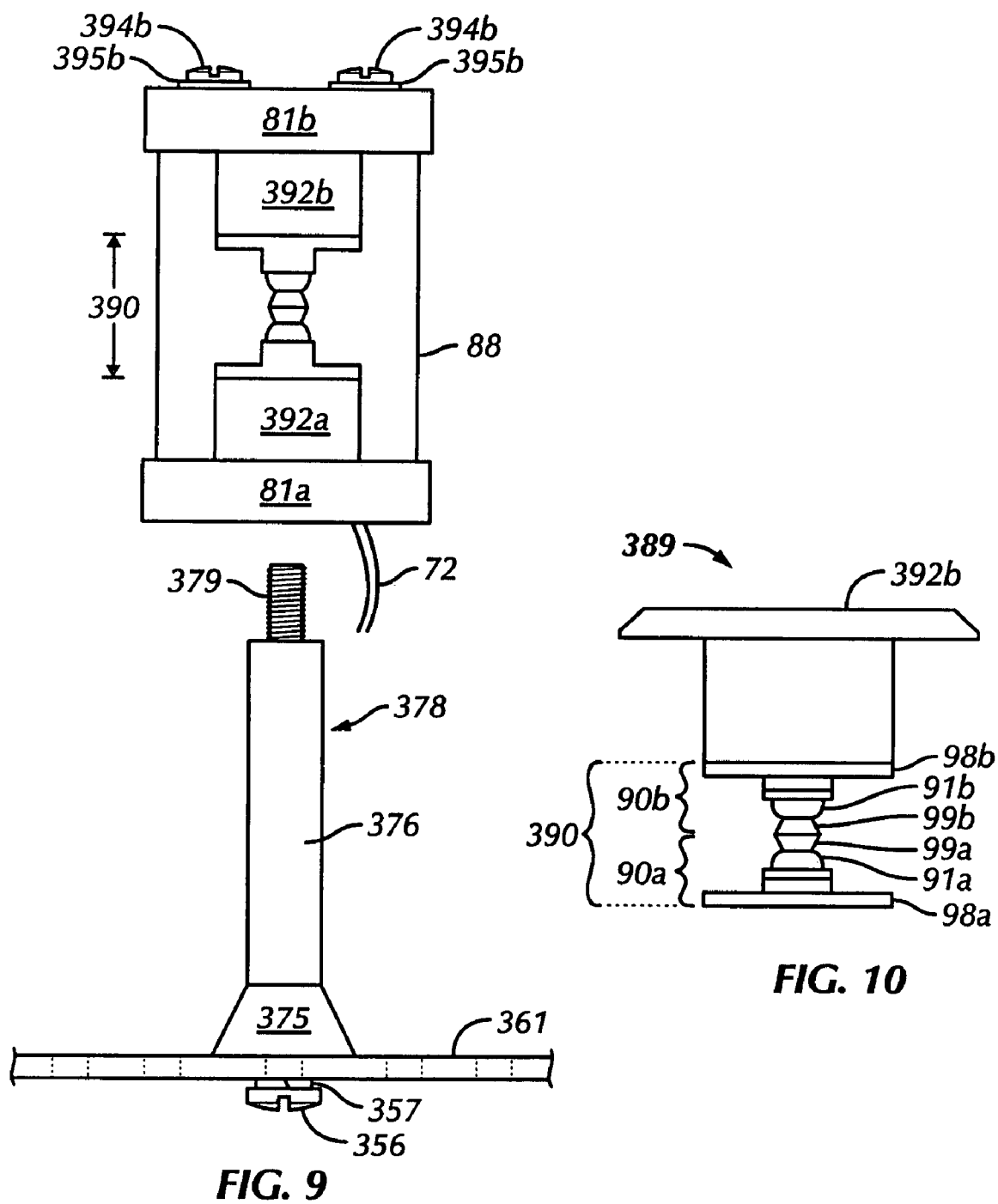
FIG. 9 is a profile view showing details of the mounting of the LED source assembly of FIG. 15.
FIG. 10 is a profile view of the LED assembly of the LED assembly of FIG. 16.

Referring to FIG. 9, a pylon 378 is mounted to a centrally positioned hole in the horizontal central section 361 of the bracket 358 by means of a screw 356 and a lock washer 357, which are threadedly engaged with a tapped axial hole on the bottom end of the pylon 378. The pylon 378 has a short frustro-conical enlarged base 375 and an extended cylindrical shank 376. The upper end of the pylon 378 is turned down and threaded to form a projecting coaxial screw end 379. An LED source assembly 380 is supported on the pylon 378 by inserting the screw end 379 of the pylon 378 into the axial hole of base 81a and thence threading the screw end 379 into the axial tapped hole in the bottom of an LED assembly 389 (FIG. 10).

The upper base 81b is then concentrically placed relative to lower base 81a. The grooved lower surface of the upper base 81b is in firm contact with the top of the LED assembly 389 and the grooved upper surface of the lower base 81a is in firm contact with the bottom of the LED assembly 389. The firm contact between the bases 81a,b and the LED assembly 389 ensures good thermal conductivity across the connections and permits heat absorbed by the LED assembly 389 to flow to the bases 81a,b. The firm contact is maintained on the top side by clamping the entire LED source assembly 380 with screws 394b and lock washers 395b inserted through the central bore of bases 81b and threadedly connected to the threaded holes on the upper ends of the LED assembly 389. The firm contact is maintained on the bottom side by screwing the screw end 379 into the axial hole of base 81a and into the bottom of the LED assembly 389.

The LED source assembly 380, as shown in FIG. 9, is designed to be a direct replacement for the first embodiment of the LED source assembly 80. The LED source assembly 380 utilizes the same lower and upper bases 81a,b, O-rings 83a,b, and cover 88 as were used in the first embodiment of the LED source assembly 80. For this embodiment, the LED assembly 389 has the same height as the LED assembly 89 of the first embodiment., but the construction differs as follows.

FIG. 10 shows the construction details of the LED assembly 389. The distal ends of the heat sink 392b and the lower base 81a have coaxial holes drilled to less than the thickness of the disks 392a,b and then tapped. The central portion of the LED source assembly 380 is composed of a dual-stack LED assembly 389. Each of the LEDs 91a,b is attached to its respective LED mount 98a,b with an adhesive such as Loctite Product Output 315, which is a high temperature thermally conductive one-part acrylic adhesive or a two-part epoxy compounded with a filler such as aluminum nitride or silver to enhance the thermal conductivity of the adhesive bond. An LED unit 390 contains two LED modules 90a,b. Each LED module has one LED 91, one LED lens 99 and one LED mount 98.

The LED module 390 is connected to the LED power terminal 67 on the carrier plate PCB 342, or alternatively each LED module 90a,b is connected to the LED power terminal 67 so that electric power can be transmitted individually to the LED modules 90a,b for the lighting device 300.

Figure 11:
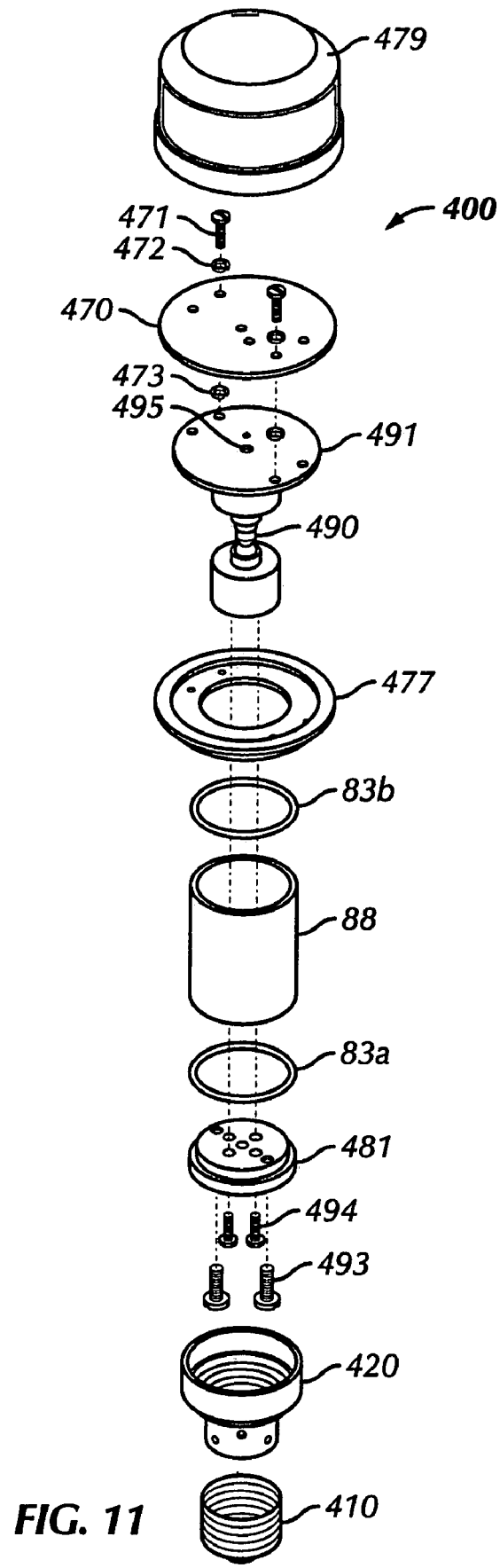
FIG. 11 is an oblique exploded view of another embodiment of the lighting device of the present invention.
Figure 12:
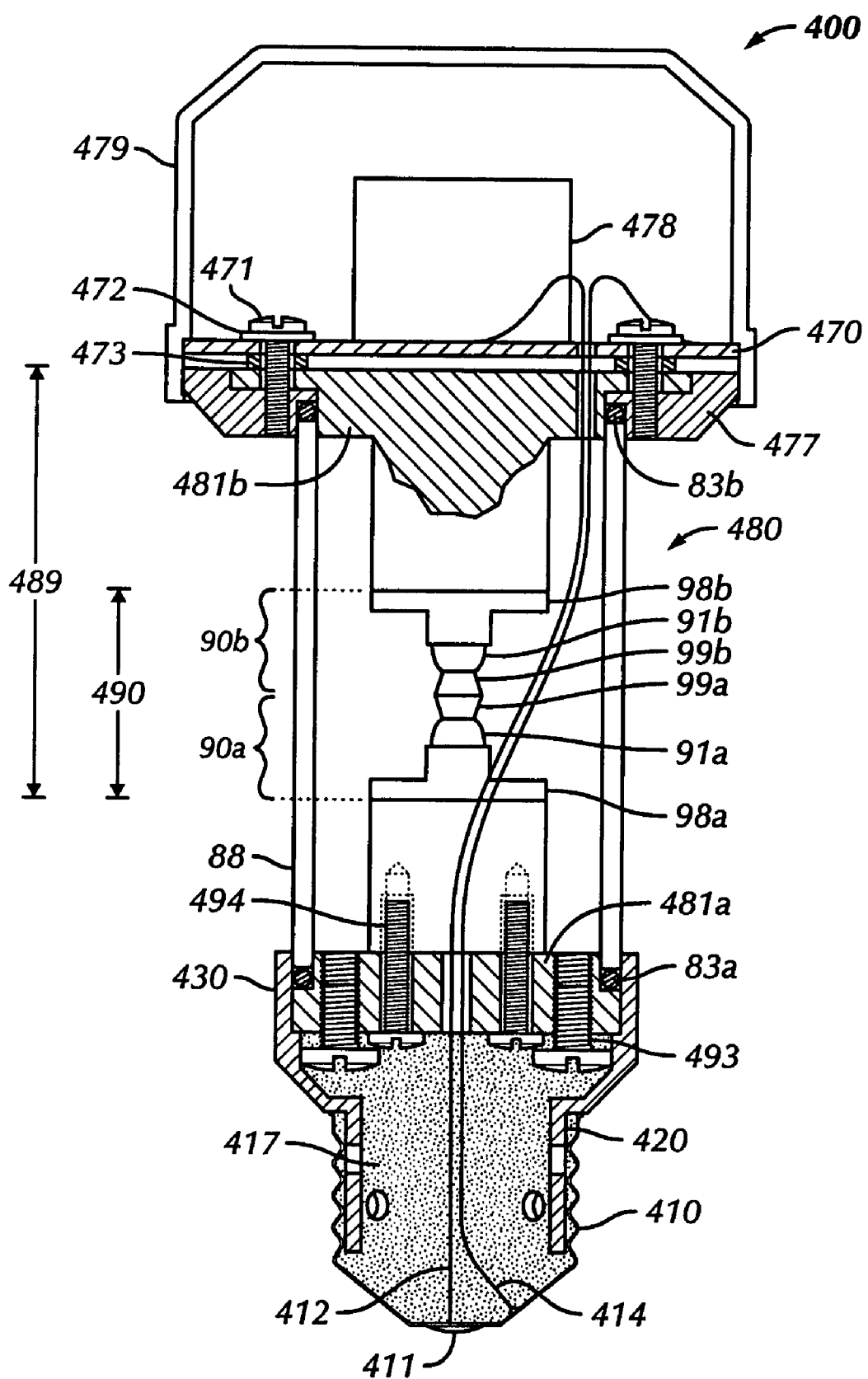
FIG. 12 is a vertical cross-sectional view of the lighting device of the present invention of FIG. 11.

Referring to FIG. 11-12, another embodiment of a lighting device 400 of the present invention is shown. This embodiment, which has its own (either open-frame or closed-frame) electrical power supply unit 478 for converting the input electric current, is configured to be mounted in a standard screw-in type socket base. A screw plug shell 410 is a substantially constant thickness, thin-walled, modified cylindrical shell. The screw plug shell 410 has, from its upper end, a short straight right circular cylindrical segment, a downwardly extending roll-formed righthand thread compatible with one of the standard sizes of screw-in sockets, and a frustro-conical end which is reduced in diameter on its lower end. The major diameter of the thread is the same as the outer diameter of the upper segment, while the minor diameter is the same as the largest diameter of the frustro-conical lower end. The top end of the screw plug shell 410 is open.

A first input power wire 412 is insulated except on its lower and upper ends. A solder contact button 411 is a highly ovaled ovate spheroid which has a relatively short axial length compared to its diameter. The contact button 411 is positioned coaxially at the lower end of the first wire 412. The first wire 412 is positioned coaxially with the screw plug shell 410 such that the contact button 411 protrudes slightly beyond the lower end of the screw plug shell 410. A second input power wire 414 is insulated except on its lower and upper ends and is soldered at its lower end to the interior lower end of the screw plug shell 410.

A potting cup 420 is an annular cylinder having a thin wall of a constant thickness over most of its length and constructed of a nonconductive compound, such as a high molecular weight high density filled polyethylene or a phenolic resin. Starting from the upper end, the potting cup 420 has a short, right-circular, cylindrical annulur section with an upwardly facing first internal transverse shoulder at approximately midlength, joined by a frustro-conical transition to a reduced diameter, an inwardly projecting second transverse shoulder section, and a straight cylindrical section. The length of the lower cylindrical section is equal to approximately half of the overall length of the potting cup 420. The lower cylindrical section is penetrated by multiple radially oriented circular holes. The potting cup 420 is inserted into the larger, upper end of the screw plug shell 410 so that its downwardly facing second transverse shoulder abuts the upper transverse end of the screw plug shell 410.

A lower end plate 481a is a short, right-circular, cylindrical disk (made of a material such as black anodized aluminum) with a larger diameter lower end which has a close slip fit to the upper inner diameter of the potting cup 420, a transverse upwardly facing shoulder, and a smaller diameter upper end which is a close slip fit inside the bore of the cover 88. The outer diameter of the lower end plate 481a is the same as that of the cover 88. The lower transverse face of the lower end plate 481a rests against the upwardly facing first transverse shoulder of the potting cup 420. The diameter of the upper end is reduced so that it and the upward facing transverse shoulder can serve as two sides of a face-seal O-ring groove for the mounting of the O-ring 83a. The inner diameter of the upper end of the potting cup 420 then serves as the third side of the face-seal O-ring groove. The disk 481a has an axial through hole for passage of wires 412 and 414 and a first pattern of four equispaced off-axis through holes located on a circle with a diameter equal to about one third of the lower end plate 481a outer diameter. Additionally, two other drilled and tapped-through holes in a second pattern are diametrically opposed and located at radii equal to about two thirds of the outer diameter of lower end plate 481a. The lower end plate 481a is mounted with its axis vertical. Multiple panhead screws 494 are mounted in the first pattern of holes of lower end plate 481a with their threaded ends protruding upwardly above the upper transverse face of the plate to engage an LED assembly 489, as described in a subsequent paragraph. The set screws 493, as shown in FIG. 12, are mounted in the drilled and tapped holes of the second hole pattern and extend downwardly below the lower transverse surface of the lower end plate 481a.

The LED assembly 489 is similar to the LED assembly 89 (FIG. 6) and LED assembly 389 (FIG. 9-10), described previously. The lower transverse end of the LED assembly 489 is provided with a concentric circular pattern of drilled and tapped holes consistent with the pattern in the lower end plate 481a so that screws 494 can be used to attach the lower end plate 481a onto the bottom of the LED assembly 489, as shown in FIG. 11-12. An upper heat sink disk 481b is also provided with multiple off-axis drilled holes for the mounting of the power supply 478 and its cover 479.

The main portion of the LED source assembly 480 is the LED assembly 489 which is similar to LED assembly 89 described in the first embodiment.

The LEDs 91a,b are attached to their respective LED mounts 98a,b with an adhesive such as Loctite Product Output 315, which is a high temperature thermally conductive one-part acrylic adhesive or a two-part epoxy compounded with a filler such as aluminum nitride or silver to enhance the thermal conductivity of the adhesive bond.

The LED unit 490 is connected (not shown) to the power supply 478 so that electric power can be transmitted to the LED modules 490 for the lighting device 400. Alternatively, each LED module 90a,b is connected (not shown) to the power supply 478 so that electric power can be transmitted to the individual LED modules 90a,b for the lighting device 400.

A clamp ring 477 is a horizontal, nonconductive member (made of a material such as plastic). Clamp ring 477 mounts the cover 88 and the power supply module 478 to the lighting device 400 when the ring 477 is clamped to the heat sink disk (upper base) 481b of the LED assembly 489. The clamp ring 477 is an annular flat ring with transverse upper and lower surfaces and a right circular cylindrical outer face with a large chamfer on its lower external corner. The clamp ring 477 has a concentric, circular, through-bore with a first downwardly facing counterbore on its lower side and a larger second counterbore on its upper side. The first counterbore is a close slip fit to the exterior of cover 88, and the second counterbore is a slip fit to the outer diameter of the heat sink disk 481b. Both counterbores are adjoined to the central bore by transverse shoulders. Drilled and tapped vertical off-axis holes are provided on the same pattern as those of the off-axis holes in the heat sink disk 481b for engagement by pan head screws 471 and washers 472, so that the clamping of the clamp ring 477 to the heat sink disk 481b can be accomplished.

A power supply printed circuit board (PCB) 470 is made of conventional nonconductive, printed circuit board material with structural and electrical attachments provided for the schematically shown power supply 478. The wires 412 and 414 are attached to the power supply 478, as are the leads conveying power to the LEDs 91. The power supply 478 operates without use of a transformer and rectifies the input power if it is AC, and adjusts the voltage level of the output to conform to the needs of the LEDs 91 in each of the LED modules 90a,b.

The snap-on, protective cover 479 is a thin-walled structure (made of a material such as plastic) with a vertical right circular cylindrical side joined to a transverse upper diaphragm by a large chamfer. The lower opening of the cover 479 is slightly enlarged to provide sufficient interference fit to either or both of the outer diameters of the power supply PCB 470 and the clamp ring 477 that the cover can be retained thereon.

The lighting device 400, as shown in FIG. 11, is assembled in two sequential steps. For the first step, before assembly, the clamp ring 477 is concentrically positioned against the lower side of the heat sink plate 481b of the LED assembly 489. A first O-ring 83b is placed in the face seal O-ring groove formed between the heat sink plate 481b of the LED assembly 489 and the clamp ring 477. The cover 88 is concentrically positioned with its upper end abutting the first O-ring 83b in the upper face seal groove. A second O-ring 83a is placed concentrically around the reduced-diameter, upper cylindrical face of the lower end plate 481a and then screws 494 are used to connect the lower end plate 481a to the bottom transverse end of the LED assembly 489 using the tapped holes thereon.

The upper end of the potting cup 420 is engaged around the second O-ring 83a, the cover 88, and the lower end plate 481a so that the upper transverse interior shoulder of the potting cup 420 abuts the lower end of the lower end plate 481 a. At this point, both O-rings 83a,b are sealingly engaged so that the volume enclosed by the cover 88 is isolated. The length of the cover 88 is selected such that the O-rings 83a,b are compressed sufficiently to provide sealing but are not over compressed whenever the LED assembly 489 is clamped together with the lower end plate 481a by the screws 494. The first input power wire 412 and the second input power wire 414 are then inserted through the axial holes in lower end plate 481a and the LED assembly 489, respectively, as the screw plug shell 410 is concentrically abutted with the intermediate downwardly facing transverse shoulder of the potting cup 420.

For the second assembly step, the elements of an inverted plug base assembly 430 (consisting of the screw plug shell 410, the potting cup 420, the lower end plate 481a, wires 412 and 414, and the screws 493 and 494) are potted together with insulative ceramic or plastic potting compound 417, as shown in FIG. 12. The potting compound 417 completely fills the interior of the shell 410 to the bottom end of the screw plug shell 410 and interconnects the elements of the plug base assembly 430. Specifically, the potting compound 417 firmly engages the interior threads of the screw plug shell 410, the radial holes in the potting cup 420, the wires 412 and 414, and the downwardly protruding threaded ends of the Allen head set screws 493, so that the assembly 430 is unitized. The contact button 411 protrudes outwardly beyond the end of the screw plug shell 410.

The final assembly steps involve attaching the LED power leads (not shown) from one of the LEDs 91 in each of the LED modules 90a,b to the electrical power supply PCB 470, along with the upper ends of the input power wires 412 and 414. Panhead screws 471 are then inserted through the provided holes in the PCB 470, nonconductive plastic tubular standoffs 473 and the off-axis holes in the heat sink disk 481b, and then threadedly engaged in the tapped holes provided in the clamp ring 477. The standoffs 473 help isolate the PCB 470 from the head of the heat sink disk 481b. The snap-on cover 479 can then be axially engaged by forcing it onto the outer peripheries of the PCB 470 and the clamp ring 477 to complete the assembly of the LED source module 400.

Operation of the Invention

The present invention is a compact, high intensity light source (lighting device), based upon high flux light emitting diodes (LEDs), which is configured in one embodiment to serve as a direct replacement for electrical single bulb incandescent light sources in existing lighting devices for marine, highway and airway traffic. The lighting device 10 of the present invention is particularly suited for marine and airway navigation aids. The lighting device 400 is suitable for a wider spectrum of devices such as standard traffic lights, roadway hazard lights and airport runway lights.

The lighting device 10 of the present invention avoids the need to replace existing lighting fixtures, especially the expensive fresnel lens used to focus the emitted light beam when converting from an incandescent to an LED light source. Prior LED light sources used large quantities of LEDs to get sufficient light output and are physically too large to fit into existing fresnel lenses. Furthermore, prior LED light sources were unsuitable for placing within existing fresnel lenses or using as a retrofit for existing lighting fixtures due to the substantial deviation of location from the focal point of those fresnel lenses.

Conventional single bulb light source filaments for typical navigation aids are very compact and hence closely resemble point sources. Consequentially, the light beam emitted when using the prior LED light sources with the single bulb fresnel lenses is sufficiently unfocused that the required light intensities cannot be obtained. The physical configurations of the LED patterns in the different embodiments of the present invention are sufficiently compact that existing fresnel lenses designed for single incandescent bulb sources can be used successfully. In addition, the compactness of the described LED assemblies allows them to be placed at appropriate positions within the lens of the lantern structure. The sizes and attachment points of the mounting U-bracket and base plate and controller assemblies are also compatible with the mounting base of the large number of existing units based upon commercially available lighting devices such as the marine beacon designs of Automatic Power, Inc., Houston, Tex.

Although the high flux LEDs provide sufficient candlepower, they introduce the necessity to convey heat away from the LEDs to avoid reducing the useful lifespan of the LEDs. This requirement is due to a rapid deterioration in LED useful life when exposed to temperatures elevated above a critical threshold. Since the LED assemblies of this invention are almost fully enclosed or fully enclosed and sealed, use of the thermally conductive support mountings for the LEDs as heat sinks to distribute the heat away from the LEDs increases the life expectancy of the LEDs and further enhances the practicality of the lighting devices of the present invention. This is particularly important for the high flux LEDs. The heat conducted away from the LEDs by the heat sink behavior of the support mountings of the LED assemblies is conveyed to the bases where it is radiated away.

Furthermore, the high flux LED configuration which provides a point source requires no diffuser since the narrowly focused light output of the LED source assembly causes the light emitted by the LED assemblies of the present invention to be uniformly distributed in spherical coordinates. This good light distribution of the unsupplemented LED assemblies increases their usefulness in certain navigation aid lighting devices. The approximation to uniformity of the light from the combination of the LED and the LED lens is sufficient to permit using the embodiments of the present invention as a substitute for existing navigation aid incandescent bulb light sources.

The general operation of the lighting device is mounted on a supporting structure, such as the marine piling 2 that is shown in FIG. 1. The mounting base 20 and lantern assembly 30 are generally common to the various embodiments of lighting device 10, since the controller assembly 40 and LED source assemblies are all designed to be retrofits into existing units in the field.

The mounting base 20 provides a housing for the controller assembly 40 and serves as a base for stable support of the lantern lens assembly 30. The controller assembly 40 serves to condition the power provided to operate the LCD assembly of the lighting device so that it is delivered at the proper voltage, has current limiters, and other desirable features. Since many navigation aids are required to flash in a prescribed, regular pattern, the controller assembly 40 also provides power level, control and timing functions to cause its output power to the light source to turn on at the desired power level and only when it is required (such as during darkness) and to cycle on and off in order to cause flashing in the prescribed pattern. All of these functions are standard requirements for beacons and marine lighting devices used in existing navigation aids.

The structure of the LED source assemblies all have certain key features in common, in that all use a cover 88 mounted in the same manner with O-rings in grooves in the end bases. The primary differences in LED mounting construction lie in the number of LEDs required and the arrangement of the LEDs and the structural supports for the LEDs so that construction of the LED source assemblies is eased and the LED assemblies can properly reject the heat produced by the LEDs. Besides providing structural support for mounting and aligning the LEDs, each of the LED units provides a heat sink and a path for conductive heat transfer to the end bases of the LED source assemblies so that the excess heat load from the LEDs can be released through radiation. Whenever the LED source assemblies are not sealed and an air circulation path is provided, the heat is also removed via convection with the circulating air within the lantern lens assembly 30. The heat is then released to the walls of the lantern lens assembly 30 and housing (mounting base) 20 and, in turn, to the external environment. The required size of the LED modules is related to the heat generated by its set of LEDs, with higher heat fluxes requiring larger heat sinks in order to hold the LED temperature below the critical threshold at which LED life is precipitously reduced.

The construction of the LED source assemblies is sufficiently compact to permit their use with preexisting fresnel lenses 37, since the LEDs in the array for the different types of LED assemblies are positioned closely enough to the focal point of the lenses 37 to avoid excessive divergence of the emitted light from the lenses 37.

The lighting device 400 with its threaded base offers a convenient unitized light source which can be installed by simply screwing it into a standard threaded socket. Because the power supply 478 is not based upon use of a transformer, the power supply can operate on any AC input voltage over a broad range of, say, between 85 VAC and 265 VAC. This permits the same LED source module to work in both Europe and the United States, thereby simplifying stocking of inventory.

Although the lighting device 400 can be used in a lighting fixture with a fresnel lens, it is anticipated that it will more commonly be used in applications without the fresnel lens. The uniform distribution of light make the lighting device 400 particularly suitable for a wide variety of applications, such as aviation runway lights, marker lights for marine bridges and piers, hazard lights, marker lights for towers and buildings, and traffic lights. Without the restrictions imposed by the fresnel lens 37 (such as positioning the point source within a very small vertical area), many pairs of LED modules can be stacked for differing requirements.

The LED assembly 489 uses a similar but integral heat sink disk for conducting heat away from its LEDs. Its relatively low construction cost and long life can permit the sealed LED source module 400 to be employed economically on a throw-away basis.

As can be seen by the above-described embodiments, existing lanterns can be retrofitted with the dual LED point-source technology to provide less expensive, longer-lasting lighting devices.

Although the present invention and its advantages have been described in detail, it should be understood that various changes, substitutions and alterations can be made herein without departing from the spirit and scope of the invention as defined by the appended claims.

What is claimed is:

1. A marine safety lighting device comprising:
(a) a coaxially aligned lighting subassembly having:
(i) an LED module including
a first lens and a second lens substantially identical to the first lens, each lens having a first side and a second opposed side, wherein the first side of the first lens faces and abuts the first side of the second lens forming a lens interface,
a first LED coaxially aligned with the first lens and attached to the second side of the first lens,
a second LED coaxially aligned and facing the first LED, the second LED coaxially aligned with the second lens and attached to the second side of the second lens,
a first thermally conductive mount attached to a side of the first LED opposed to the first lens, and
a second thermally conductive mount attached to a side of the second LED opposed to the second lens, and
(ii) a first heat sink having a first side and a second side, wherein the first side is mounted to a first end of the lighting subassembly and in thermal communication with the first thermally conductive mount of the LED module,
(iii) a second heat sink mounted to a second end of the lighting subassembly and in thermal communication with the second thermally conductive mount of the LED module,
(iv) a base unit secured to the second side of the first heat sink, and
(v) a tubular member surrounding the LED module, wherein the tubular member links the first heat sink to the second heat sink and the base unit to form a mid-portion of the external surface of the lighting subassembly;
(b) a power source for providing electrical power to the lighting subassembly;
(c) a fresnel lens having a bull's eye, the fresnel lens encircling the lighting subassembly with the bull's eye aligned with the lens interface, whereby substantially all light emitted from the LED module passes through the tubular member first and then the bull's eye in uniformly distributed coordinates.

2. The lighting device of claim 1, wherein the first and second heat sinks are circular disks.

3. The lighting device of claim 1, wherein a first end of the tubular member is mounted in a first groove in the first heat sink and a second opposed end of the tubular member is mounted in a second groove in the base unit.

4. The lighting device of claim 1, wherein the tubular member is made of an optically transparent, heat resistant material.

5. The lighting device of claim 1, wherein the fresnel lens is hinged to a housing of a marine safety light.

6. The lighting device of claim 1, wherein the first heat sink, the second heat sink, and the base unit have a plurality of apertures for providing air circulation between a first air space located between the LED module and the tubular member and a second air space located between the tubular member and the fresnel lens.

7. The lighting device of claim 1, wherein the lighting device further comprises a power controller for regulating the polarity, voltage, and current limits of the electricity going to the LEDs.

8. The lighting device of claim 1, further comprising a threaded light socket base.

9. The lighting device of claim 1, further comprising a threaded light socket base electrically connected to the LED module.

10. The lighting device of claim 1, further comprising an air circulation means for removing heat generated by the LED module.

11. The lighting device of claim 1, wherein the first and second lens are trapezoidal.

12. A modular lighting subassembly for replacing a light source mounted in a fresnel lens of a marine safety light, the lighting subassembly including:
(a) a stacked pair of contrapositioned substantially identical LED modules, wherein each LED module comprises:
a light-emitting LED having a driving current of at least one Watt,
a thermally conductive mount having a first side of the LED mounted on one side of the mount, and
a trapezoidal LED lens coaxially aligned with the LED, the lens having a first transverse surface and second transverse surface parallel to the first transverse surface, wherein the first transverse surface is adhered to a second side of the LED opposite the thermally conductive mount, the LED lens refracts the light emanating from the LED to enhance the emission of light from a side of the LED,
wherein the second transverse surface of the LED lens attached to the LED of one LED module faces and adjoins the second transverse surface of the LED lens mounted to the other LED;
(b) a first heat sink having a first side and a second side, wherein the first side is positioned on a first end of the lighting subassembly and thermally communicating with at least one thermally conductive mount;
(c) a second heat sink mounted on a second end of the lighting subassembly;
(d) a base unit secured to the second side of the second heat sink;
(e) an optically transparent tubular member encircling the stacked pair of LED modules, wherein a first end of the tubular member is mounted in a first groove in the first heat sink and a second end of the tubular member is mounted in a second groove in the base unit; and
(f) a fresnel lens having a bull's eye, the fresnel lens encircling the tubular member with the bull's eye aligned with the stacked pair of LED modules, whereby substantially all light emitted from the LED modules passes through the bull's eye in uniformly distributed coordinates.

13. The lighting subassembly of claim 12 having a plurality of stacked pairs of LED modules.

14. The lighting subassembly of claim 12, wherein the first transverse surface is shorter than the second transverse surface.

15. The lighting subassembly of claim 12, wherein the second heat sink is mountable on a portion of a housing covered by the fresnel lens.

16. The lighting subassembly of claim 12, wherein the first heat sink and the base unit have a plurality of apertures, the apertures passing from a first air space located between the tubular member and the stacked pair of LED modules and a second air space located between the fresnel lens and the lighting subassembly.

17. The lighting subassembly of claim 12, further comprising a threaded light socket base electrically connected to the LEDs.

18. The lighting subassembly of claim 12, further comprising an air circulation means for removing heat generated by the stacked pair of LED modules.

19. The lighting subassembly of claim 12, having two stacked pairs of LED modules, wherein a height of the two stacked pairs of LED modules is less than or equal to a height of the bull's eye.

20. The lighting subassembly of claim 12, wherein a diameter of the first transverse surface is similar to a diameter of the LED.

21. The lighting subassembly of claim 12, wherein the first heat sink is larger than one LED module.

22. The lighting subassembly of claim 12, wherein the light refracted by the stacked pair of LED lens passes first through the tubular member and then through the bull's eye of the fresnel lens.

23. A marine safety lighting device comprising:
   (a) a coaxially aligned lighting subassembly having:
      (i) an LED module including
         a first lens and a second lens substantially identical to the first lens, each lens having a first side and a second opposed side, wherein the first side of the first lens faces and abuts the first side of the second lens forming a lens interface,
         a first LED coaxially aligned with the first lens and attached to the second side of the first lens,
         a second LED coaxially aligned and facing the first LED, the second LED coaxially aligned with the second lens and attached to the second side of the second lens,
      (ii) a first heat sink having a first side and a second side, wherein the first side is mounted to a first end of the lighting subassembly and in thermal communication with the first LED,
      (iii) a second heat sink mounted to a second end of the lighting subassembly and in thermal communication with the second LED, and
      (iv) a tubular member surrounding the LED module;
   (b) a fresnel lens having a bull's eye, the fresnel lens encircling the lighting subassembly with the bull's eye aligned with the lens interface, whereby substantially all light emitted from the LED module passes through the tubular member first and the bull's eye secondly in uniformly distributed coordinates.

24. The lighting device of claim 23, wherein a diameter of the second side of the first lens is similar to a diameter of the first LED.

25. The lighting device of claim 23, wherein the first LED is similar in size to the first lens.

26. The lighting device of claim 23, wherein a height of the LED module is less than or equal to the height of the first heat sink.

27. The lighting device of claim 23, wherein a height of the LED module is less than or equal to the height of the bull's eye.

* * * * *